No. 664,274. Patented Dec. 18, 1900.
G. G. KERR.
BICYCLE.
(Application filed May 18, 1900.)
(No Model.) 2 Sheets—Sheet 1.
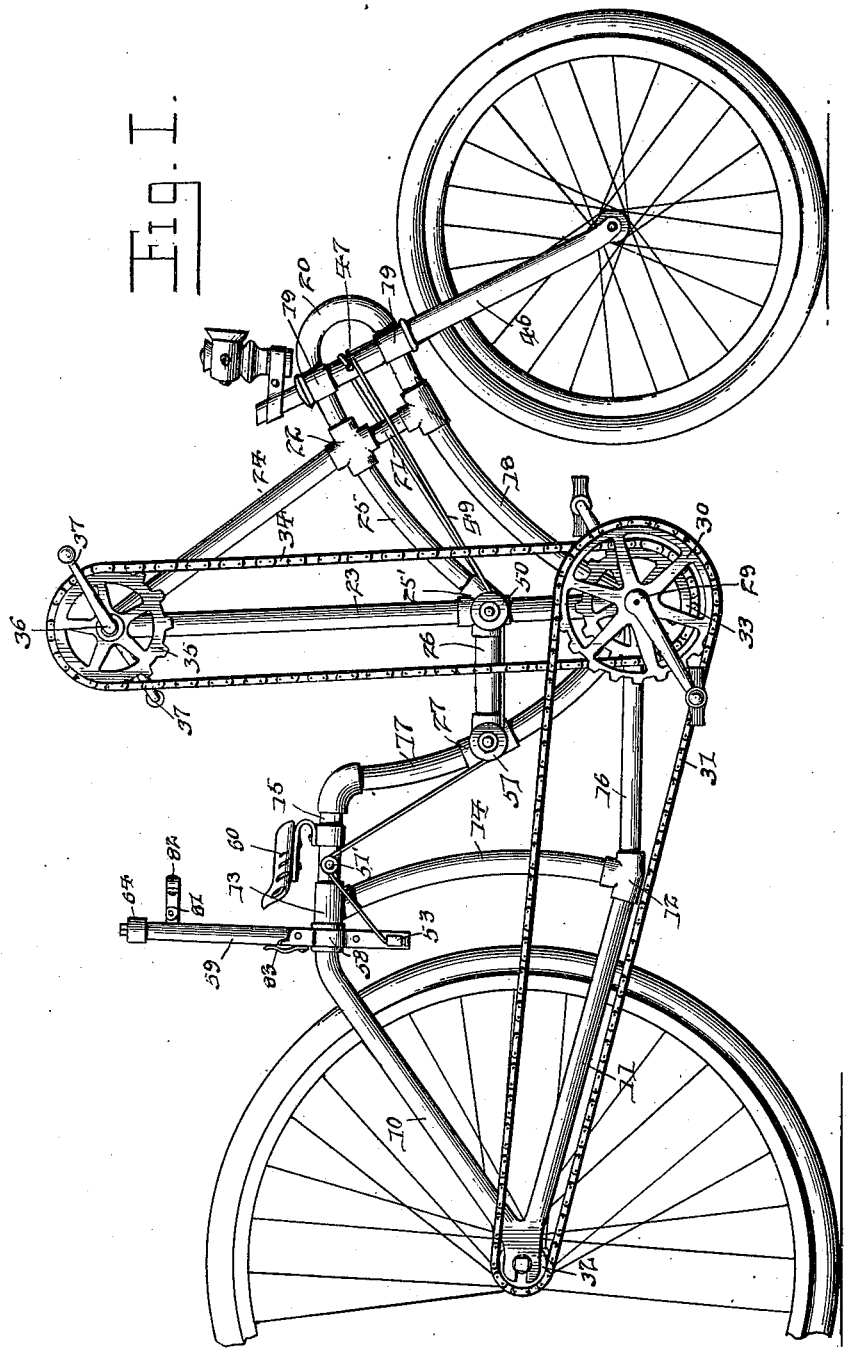
Witnesses
F. E. Alden.
Geo. H. Chandler
George G. Kerr Inventor
by C. A. Snow & Co.
Attorneys

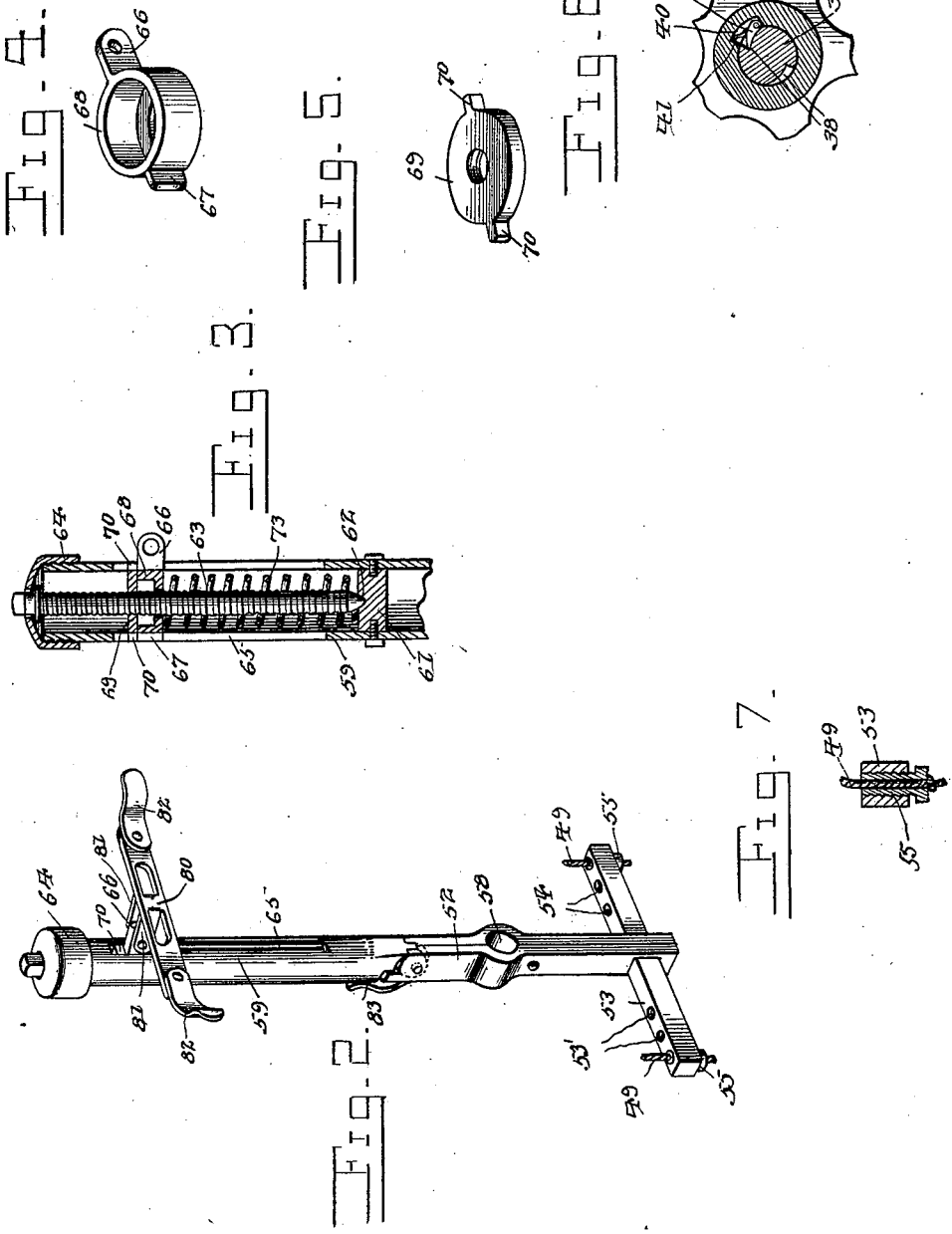

UNITED STATES PATENT OFFICE.

GEORGE G. KERR, OF MOUNT JEWETT, PENNSYLVANIA.

BICYCLE.

SPECIFICATION forming part of Letters Patent No. 664,274, dated December 18, 1900.

Application filed May 18, 1900. Serial No. 17,126. (No model.)

*To all whom it may concern:*

Be it known that I, GEORGE G. KERR, a citizen of the United States, residing at Mount Jewett, in the county of McKean and State of Pennsylvania, have invented a new and useful Bicycle, of which the following is a specification.

This invention relates to bicycles in general, and more particularly to that class which are adapted to be driven by both the hands and the feet of the rider; and the objects of the invention are to provide a construction for efficiently conveying the motion to the drive-wheel of the bicycle and also to provide simple and efficient means for steering the bicycle, it being of course understood that the principles involved may be embodied in a similar vehicle of any specific style.

In the drawings forming a portion of this specification and in which like numerals of reference indicate similar parts in the several views, Figure 1 is a side elevation showing a bicycle constructed in accordance with the present invention. Fig. 2 is a detail perspective view of the steering-lever and showing the position of the adjustable back-rest carried thereby. Fig. 3 is a vertical section of the upper portion of the steering-lever and showing the means for adjusting the back-rest with respect thereto. Fig. 4 is a detail perspective view of the follower to which the back-rest is secured. Fig. 5 is a detail perspective view of the nut which directly operates the follower. Fig. 6 is a radial section of a hand-wheel and illustrating the forward ratchet connection between it and the hand crank-axle. Fig. 7 is a detail sectional view taken transversely of the transverse bar at the lower end of the steering-lever.

Referring now to the drawings, the bicycle of the present invention comprises a frame including rear forks 10 and tie-rods 11, which are mutually connected at their rear ends in the usual manner. The forward ends of the tie-rods are connected with a bracket 12, while the forward ends of the rear fork are connected with a second bracket 13, these brackets being connected by an upright tube 14, which is preferably arc-shaped. A top bar or tube 15 is connected with the forward end of the bracket 13, and a tube 16 is connected with the forward end of the bracket 12, this tube being in turn connected with a crank-hanger bracket, from which leads a tube 17 to the top bar 15. From the crank-hanger leads a bottom bar 18 to a head which comprises upper and lower members 19 in axial alinement and mutually connected by an arc-shaped tube 20. A brace 21 is connected at one end with the tube 18 and at the other end with a bracket 22, which is in turn connected with the upper member of the head. A crank-supporting upright tube 23 is connected at its lower end with the crank-hanger and lies between the top bar 15 and the brace 21, a brace-tube 24 being connected at the upper end of this upright 23 and also to the bracket 22. A tube 25 is connected with the bracket 22 and with a tube 23 at a point above the crank-hanger, this connection being through the medium of a bracket $25^a$, and a brace-tube 26 is connected with the bracket $25^a$ and the tube 17, this connection of the brace 26 with the tube 17 being through the medium of a bracket 27.

In the crank-hanger is mounted a crank-shaft in the usual manner and having the usual construction, and this crank-shaft is provided with cranks and pedals, as shown.

Mounted upon the crank-shaft, which is indicated by the numeral 29, is a sprocket-wheel 30, with which is engaged a chain 31, leading to a sprocket 32 upon the drive-wheel of the bicycle. A second sprocket 33 is mounted upon the shaft 29 and has a chain 34 engaged therewith and which leads to a sprocket 35, mounted upon a shaft 36, which is journaled at the point of connection of the tubes 23 and 24. This shaft 36 has hand-operated cranks 37 connected therewith, and motion is communicated from the shaft to the sprocket thereon through the medium of a ratchet mechanism comprising recesses in the face of the shaft 36, which are adapted for successive engagement by a pawl 39, which is mounted in a recess 40 in the inner face of the sprocket, this pawl being held in its operative relation by a spring-finger 41. This pawl is so disposed that when the shaft is operated to move the uppermost point of the sprocket-wheel forwardly the pawl will engage a recess 38, and when the shaft is moved in the opposite direction the pawl will snap into and slide out of the recesses 38. By this means the hand-crank may be adjusted with respect to the shaft 26, so as to properly position them with respect to the cranks of the shaft 29, so that when the right foot is moving downwardly the right hand may move upwardly and the best results be secured.

In order to steer the bicycle independently of the hands of the operator, a pin 47 is engaged with the stem of the front forks 46, and steering-cords 48 and 49 are wrapped around the stem above and below the pin and have their adjacent extremities attached to the pin, these cords being passed around pulleys 50, 51, and 51' and thence to an operating-lever. This operating-lever, as shown in detail in Fig. 3 of the drawings, comprises a lower member 52, having a cross-bar 53 at its lower end, and an upper tubular member 59, having hinged connection with the lower member, for a purpose which will be presently explained.

The cross-bar 53 has a series of vertical perforations at each end, as shown at 53' and 54, which perforations are screw-threaded to receive bushings 55, having angular heads for engagement by a wrench to adjust them. The pulleys 51', which are in the form of sleeves, are mounted upon a transverse shaft passed through the portion 15 of the bicycle-frame, and the steering-cords after passing over these pulleys are passed downwardly through the bushings and are knotted at their ends to prevent withdrawal. Thus by manipulation of the bushings the tensions of the cords may be adjusted to take up slack. Furthermore, by means of the series of perforations in the cross-bar the bushings may be moved to different points of the bar to vary the leverage, and consequently the degree of movement, of the steering-wheel under the influence of the steering-lever.

The steering-lever is adapted for its pivotal movement by reason of the pivotal mounting of the lower member 52 thereof upon the frame of the bicycle in the rear of the tube 14, this member having a bearing 58, which receives the tube of the frame. It will thus be seen that if the lever is rocked it will cause a corresponding movement of the front-fork stem to steer the machine, and for this purpose the tubular member 59 is provided and is disposed behind the saddle 60 of the bicycle, which saddle is mounted upon the top bar 15. The lever is adapted for operation by the body of the rider, and to facilitate this operation an adjustable back-rest is mounted upon the tubular member for engagement by the body of the rider beneath the arms, so that swaying of the body will operate the lever. It is at times desirable to adjust this back vertically, and for this purpose the tubular member 59 has a block 61 fixed therein and provided with a depression 62, in which is journaled one end of a screw 63, the opposite end of which is journaled in a cap 64, having threaded engagement with the upper end of the tube.

The tube 59 is provided with longitudinal slots 65 at diametrically opposite points and through which project the extensions 66 and 67 of a collar 69, which is mounted loosely upon the screw, so that by manipulation of the screw these portions 66 and 67 may be moved longitudinally of the slot 65 under the influence of a nut 69, which is engaged with the screw 63 above the collar and has lugs 70, which engage the slots 65. Thus when the screw is operated in one direction the nut will be moved and will feed the collar downwardly of the tube, it being understood that this nut lies against the upper face of the collar, which latter is loose upon the screw. A helical spring 73 encircles the screw 63 and rests at one end against the block 61 and with its opposite end against the under side of the collar to force the collar upwardly when the screw is rotated to move the nut upwardly. The upper end of the screw is continued through the cap 64 and is squared, as illustrated, for engagement by a key, and thus may the back-rest be raised and lowered and may be adjusted to accommodate persons of different heights.

The back-rest proper consists of a plate 80, from which two parallel arms 81 are struck up and are disposed to receive the projection 66 of the collar between them. This position of the parts may be maintained by a bolt or rivet passed through perforations therein. To the outer ends of the plate 80 are attached arms 82, which are curved forwardly and outwardly to fit around the body of the rider below his arms, and thus insure the movement of the lever with the body. The tubular portion 59 is held normally in alinement with the lower portion 52 by means of a spring-finger 83, secured to the portion 52 and bearing at its free end against the rear face of the tubular portion 59. This finger holds the tubular portion yieldably in an erect position, so that sudden jars may not excessively jolt the rider, but will be in large part absorbed by the spring.

What is claimed is—

1. A bicycle comprising a frame comprising parallel top and bottom bars, having their forward ends connected, spaced heads carried by the top and bottom bars in the rear of their points of connection, an upright connected with the rear ends of the top and bottom bars, and having a crank-hanger at the lower end thereof, bars connected with the crank-hanger and upright and having a rear wheel connected therewith, a front fork having a stem pivoted in the heads, a steering-wheel carried by the front fork, a seat disposed between the rear wheel and the upright, a steering-lever disposed in the rear of the seat and comprising a tubular portion having a screw mounted therein; a collar in the tubular portion and having a projecting portion, a nut upon the screw and adapted to move the collar in one direction as the screw is rotated, means for returning the collar when released by the nut and a back-rest carried by the projection of the collar, and a steering-cord wound upon the stem of the front fork between the heads and having its ends attached to the lever, and steering-cords wound upon the stem between the heads.

2. A steering-lever for bicycles adapted for connection with the steering-wheel thereof, said lever comprising a tubular portion having a screw mounted therein, a collar in the tubular portion and having a projecting portion, a nut upon the screw and adapted to move the collar in one direction as the screw is rotated, means for returning the collar when released by the nut, and a back-rest carried by the collar.

3. A steering-lever for bicycles adapted for connection with the steering-wheel thereof, said lever comprising a tubular portion having a screw mounted therein, a collar in the tubular portion and having a projecting portion, a nut upon the screw and adapted to move the collar in one direction as the screw is rotated, a spring adapted to move the collar in an opposite direction, and a back-rest mounted upon the projection of the collar.

In testimony that I claim the foregoing as my own I have hereto affixed my signature in the presence of two witnesses.

GEORGE G. KERR.

Witnesses:
WILLIAM MAXWELL,
D. L. DAILEY.